US007404519B2

(12) United States Patent
Jeon

(10) Patent No.: US 7,404,519 B2
(45) Date of Patent: Jul. 29, 2008

(54) MICROWAVE OVEN WITH BAR CODE SCANNER

(75) Inventor: Sei Ill Jeon, Gimpo (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 346 days.

(21) Appl. No.: 11/131,411

(22) Filed: May 18, 2005

(65) Prior Publication Data

US 2006/0043190 A1 Mar. 2, 2006

(30) Foreign Application Priority Data

Aug. 26, 2004 (KR) ...................... 10-2004-0067628

(51) Int. Cl.
*G06K 7/10* (2006.01)
*G06K 15/00* (2006.01)

(52) U.S. Cl. ............................ 235/462.13; 235/462.43

(58) Field of Classification Search ............ 235/462.01, 235/462.13, 462.43, 462.45, 472.01; 219/714, 219/506

See application file for complete search history.

(56) References Cited

U.S. PATENT DOCUMENTS

| | | | | |
|---|---|---|---|---|
| 4,323,773 | A | 4/1982 | Carpenter | 235/473 |
| 5,321,232 | A * | 6/1994 | Ogle | 219/506 |
| 5,426,280 | A * | 6/1995 | Smith | 219/506 |
| 5,479,002 | A * | 12/1995 | Heiman et al. | 235/462.45 |
| 5,504,311 | A * | 4/1996 | DuBuis et al. | 219/714 |
| 5,938,966 | A * | 8/1999 | Oh et al. | 219/702 |
| 6,124,583 | A * | 9/2000 | Bowers | 219/714 |
| 6,359,270 | B1 * | 3/2002 | Bridson | 219/679 |
| 2003/0075538 | A1 * | 4/2003 | Kish et al. | 219/506 |
| 2004/0058706 | A1 * | 3/2004 | Williamson et al. | 455/557 |
| 2005/0016996 | A1 * | 1/2005 | Chun | 219/685 |

FOREIGN PATENT DOCUMENTS

| | | | |
|---|---|---|---|
| EP | 0 550 124 | A2 * | 7/1993 |
| JP | 57-109403 | | 7/1982 |
| JP | 61-141614 | | 9/1986 |
| JP | 02-133711 | | 5/1990 |
| JP | 4-20172 | | 2/1992 |
| JP | 6-111047 | | 4/1994 |
| JP | 8-16702 | | 1/1996 |
| JP | 2001-291122 | | 10/2001 |
| KR | 1995-0011919 | | 5/1995 |
| KR | 1999-0074607 | | 10/1999 |

OTHER PUBLICATIONS

Chinese Office Action dated Oct. 13, 2006 in Chinese Patent Application No. 200510072649.5.

* cited by examiner

*Primary Examiner*—Daniel A Hess
(74) *Attorney, Agent, or Firm*—Staas & Halsey LLP

(57) ABSTRACT

A microwave oven including: a control panel; a scanner guide in the control panel; a scanner drawable into the scanner guide and pushable out of the scanner guide; and a driving section drawing the scanner into and pushing the scanner out of the scanner guide. The bar code scanner reads a bar code when in the scanner guide and when out of the scanner guide.

11 Claims, 4 Drawing Sheets

MICROWAVE OVEN WITH BAR CODE SCANNER

CROSS-REFERENCE TO RELATED APPLICATION

This application claims the benefit of Korean Patent Application No. 2004-067628, filed on Aug. 26, 2004, in the Korean Intellectual Property Office, the disclosure of which is incorporated herein by reference.

BACKGROUND OF THE INVENTION

1. Field of the Invention

The present invention relates to a microwave oven with a bar code scanner, and more particularly to a bar code scanner installing structure of the microwave oven with a bar code scanner.

2. Description of Related Art

A microwave oven is a cooking device for heating food by using microwaves, and uses high frequency electric waves of 2,450 MHz. A conventional microwave oven is provided with selection buttons so that a user can select a general cooking process and a cooking method corresponding to the kind of food to be cooked. However, since a large variety of foods exist, the user can only cook the food by selecting a cooking process roughly (approximately) proper for various foods instead of selecting a cooking process exactly proper for various foods.

In order to improve this problem, recently, as disclosed in Korean Patent Publication No. 1999-0074607, a microwave oven for reading a bar code attached to a food package, for determining food type, and for cooking the food by automatically setting the optimal cooking time according to the determined kind of food, has been developed.

The microwave oven disclosed in Korean Patent Publication No. 1999-0074607 includes a bar code reader (or a bar code scanner) for reading a bar code attached to the food in addition to other components of the microwave oven, such as a cooking chamber, and a high frequency oscillator. The bar code reader is fixed inside the cooking chamber, or connected with a main body of the microwave oven. In the event that the bar code reader is fixed inside the cooking chamber, since the bar code attached to the food package must face the bar code reader in order to be read, it is inconvenient to use. Moreover, when the bar code reader is connected to the main body of the microwave oven, the bar code reader may fall from the main body and be damaged.

BRIEF SUMMARY

The present invention has been made in view of the above-mentioned problems, and an aspect of the invention is to provide a microwave oven which is convenient to use and has an improved bar code scanner installing structure so as to prevent the bar code scanner from damage due to falling from a main body of the microwave oven.

According to an aspect of the present invention, there is provided a microwave oven including: a body; a control panel; and a bar code scanner removably installed in the body and reading a bar code.

The bar code scanner may be installed in the control panel.

The microwave oven may also include a scanner guide for guiding the bar code scanner.

The microwave oven may also include a driving section for moving the bar code scanner forward and rearward by a specified distance so as to draw out and draw in the bar code scanner.

The driving section may also include a forwardly and reversely rotating motor, and a driving gear rotated by a driving shaft of the motor, and the bar code scanner may include a gear member section engaged with the driving gear.

The gear member may engage an electric wire cover which is connected to the end of the bar code scanner and connects the bar code scanner to the body.

The bar code scanner may change the angle of light emitted from a light emitting device.

The bar code scanner may include a body in which the light emitting device and a light receiving device are installed, and a head coupled to the front end of the body. The head may be obliquely coupled to the body, and the angle of the head may be changed by rotation so as to change the scanning angle of the light.

The bar code scanner may also include a reflective mirror, installed in the bar code scanner, for changing the scanning angle of the light by changing an angle of the reflective mirror by rotating the head.

The reflective mirror may be hinged to the inside of the head.

According to another aspect of the present invention, there is provided a microwave oven including: a control panel; a scanner guide in the control panel; a scanner drawable into the scanner guide and pushable out of the scanner guide; and a driving section drawing the scanner into and pushing the scanner out of the scanner guide. The bar code scanner reads a bar code when in the scanner guide and when out of the scanner guide.

According to another aspect of the present invention, there is provided a scanner, including: a body; a light emitting device in the body and emitting light to read a bar code; a light receiving device in the body receiving light reflected from the bar code and converting the received light into an electric signal; and a head at an end of the body, the head including a window at an end thereof through which the emitted light and the reflected light pass.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Figure 1:
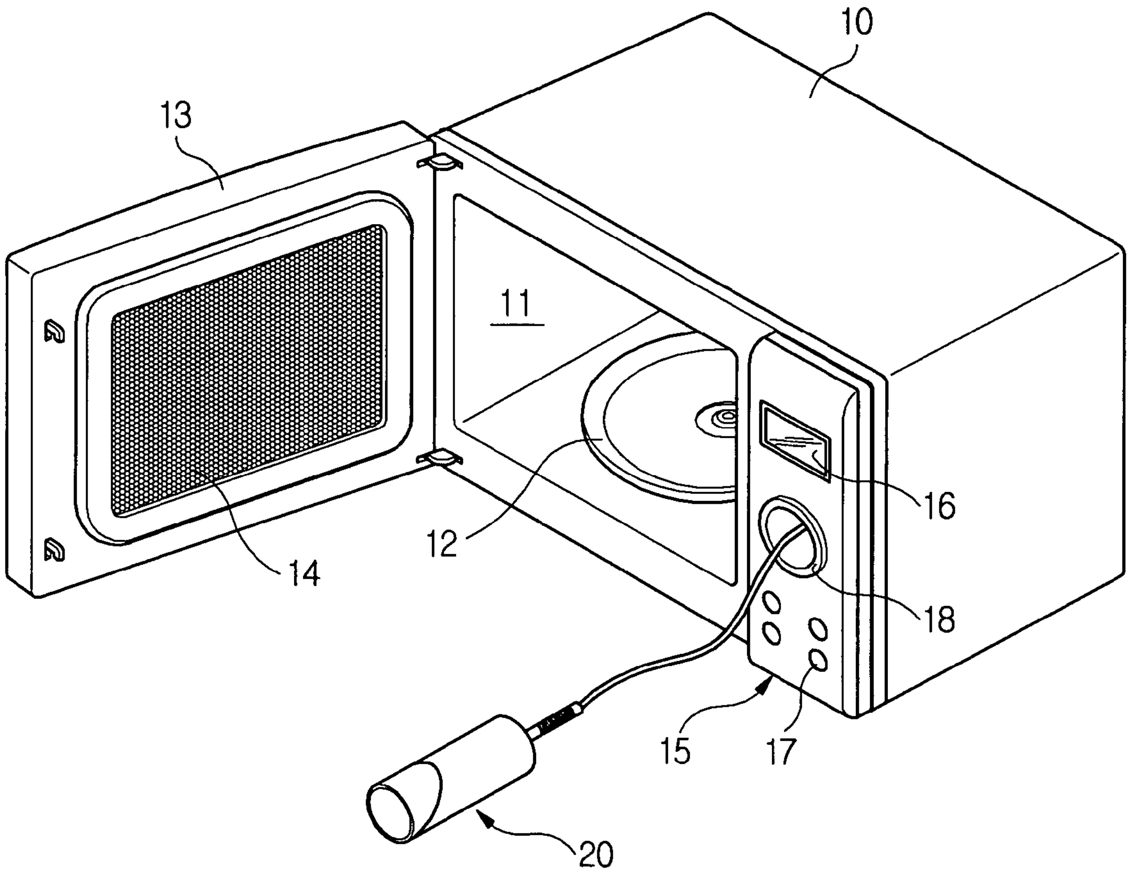
FIG. 1 is a perspective view illustrating a microwave oven having a bar code scanner according to an embodiment of the present invention.

Reference will now be made in detail to an embodiment of the present invention, examples of which are illustrated in the accompanying drawings, wherein like reference numerals refer to the like elements throughout. The embodiment is described below in order to explain the present invention by referring to the figures.

As shown in FIG. 1, a microwave oven with a bar code scanner 20 according to an embodiment of the present invention includes a housing 10 for forming the exterior of the microwave oven, a cooking chamber 11 which is provided inside the housing 10 and in which food is cooked, a door 13 hinged to the front of the housing 10 at the side thereof and for closing and opening the cooking chamber 11, and a control panel 15 provided beside the door 13 and receiving manipulation commands to operate the microwave oven.

The microwave oven includes a transparent window 14 provided at the central portion of the door 13 so as to allow visual confirmation of the cooked state of the food, and a rotating tray 12 provided in the cooking chamber 11 and rotating the food so that it is cooked uniformly. The microwave oven further includes a display 16 for displaying cooking progress or the cooking time, a switch 17 for inputting commands for operation of the microwave oven, and a bar code scanner 20 for reading a bar code marked on the food package.

The bar code scanner 20 is a device for detecting the kind of food to be cooked by reading the bar code marked on the food. The microwave oven cooks the food according to the detected kind of food by setting a proper cooking time for the food. The use of the bar code scanner is similar to a conventional bar code scanner. However, the bar code scanner 20 is inserted into and fixed at a scanner guide 18 formed at the central portion of the control panel 15, or is drawn out from the scanner guide 18 and operated by hand.

Figure 2:
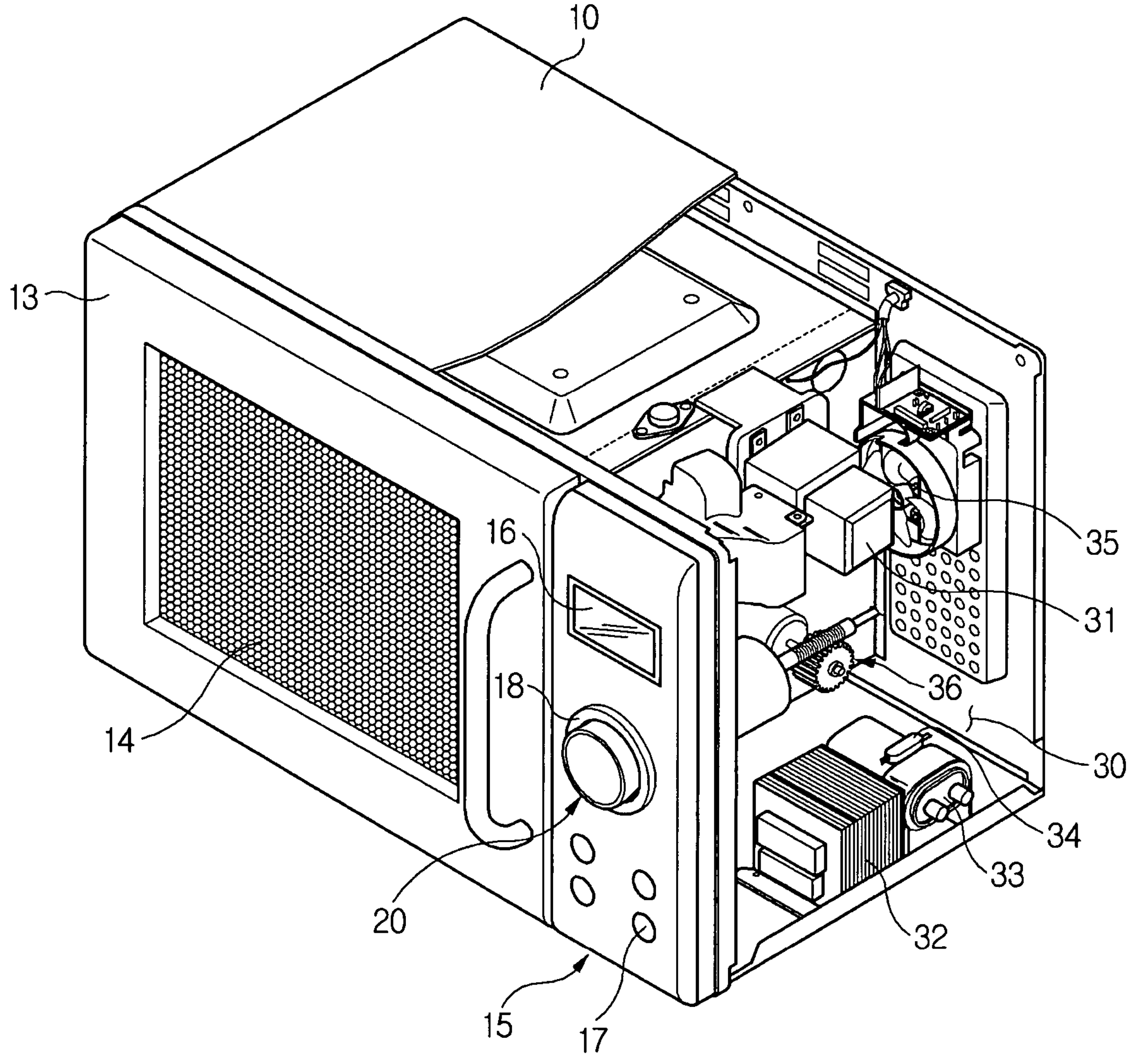
FIG. 2 is a perspective view illustrating an internal structure of the microwave oven shown in FIG. 1.

Referring to FIG. 2, an electrical component compartment 30 for installing various electrical components is defined at the rear side of the control panel 15. In the electrical component compartment 30, a magnetron 31 for generating high frequency waves as a heat source for cooking food, a high voltage transformer (HVT) 32, a high voltage capacitor 33, and a high voltage diode 34 are installed, while the HVT 32, the high voltage capacitor 33, and the high voltage diode 34 form a driving circuit for driving the magnetron. AC power (AC 110V or AC 220V) is supplied to the HVT 32 which outputs a high voltage of about 2000V. The output voltage is boosted to about 4000V by the high voltage capacitor 33 and the high voltage diode 34, and then is supplied to the magnetron 31. At the rear side of the electrical component compartment 30, a cooling fan 35 is installed to cool the electrical components in the electrical component compartment 30 by sucking in outside air. A driving section 36 for automatically advancing and withdrawing the bar code scanner 20 is installed at the rear side of the scanner guide 18 where the bar code scanner 20 is installed. The advance and withdrawal of the bar code scanner is described in detail with reference to FIG. 3.

Figure 3:
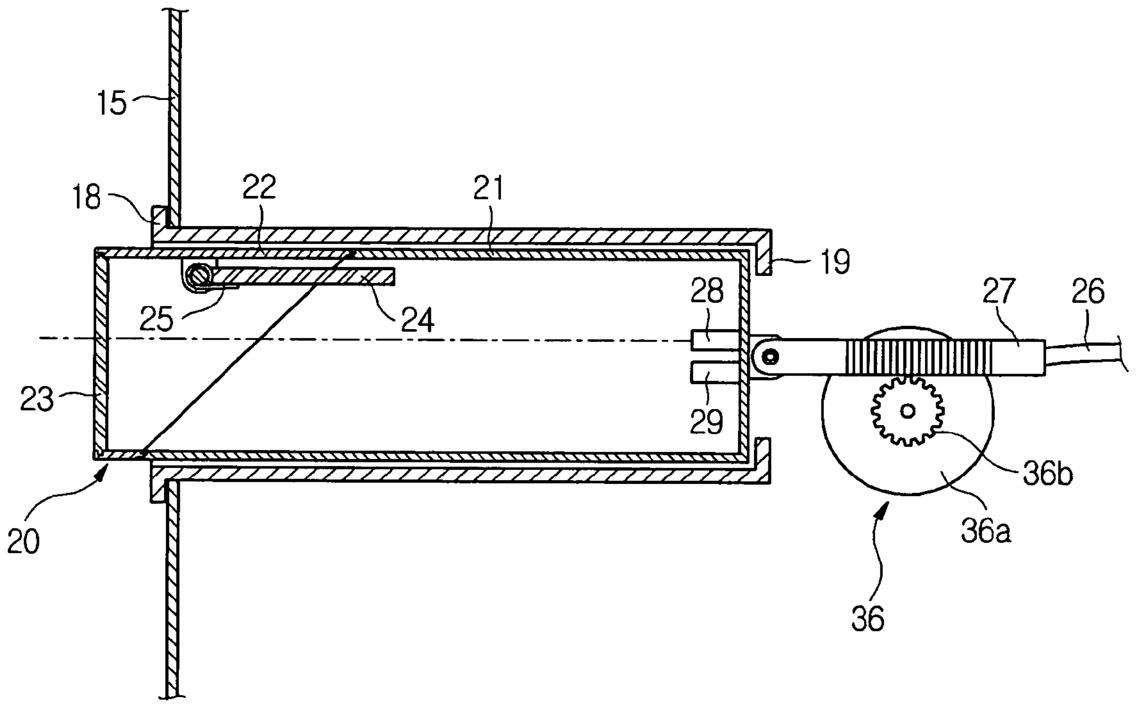
FIG. 3 is a side cross-sectional view illustrating a bar code scanner installing structure of the microwave oven shown in FIG. 1.

Referring to FIGS. 1-3, the scanner guide 18 is provided at the central portion of the control panel 15 and extends toward the rear side of the control panel, and a blocking jaw 19 for restricting the withdrawal of the bar code scanner 20 is provided at the rear side of the scanner guide 18. The bar code scanner 20 is detachably installed to the scanner guide 18.

The rear side of the bar code scanner 20 is electrically connected to an electric wire for connecting the bar code scanner 20 to a control section (not shown) and an electric power source (not shown). The electric wire 26 is surrounded by an electric wire cover 27 extended a specified length from the rear side of the bar code scanner 20. The electric wire cover 27 is hinged to the rear side of the bar code scanner 20, and formed with screw threads on the outer circumference of the electric wire cover 27. The electric wire cover 27 may be made of, by way of non-limiting examples, plastic or steel, so as to have a specified rigidity.

The driving section 36 provided at the rear side of the scanner guide 18 includes a forwardly and reversely rotating motor 36*a*, and a driving gear 36*b* rotated by and coupled to a driving shaft of the motor 36*a*. The driving section 36 is a device for inserting and withdrawing the bar code scanner 20, and operation thereof is described as follows. When a user wishes to withdraw the bar code scanner 20, the user manipulates the switch 17 of the control panel 15. Thus, the manipulation signal is transmitted to the control section (not shown). The control section drives the motor 36*a*, so that the driving gear 36*b* is rotated in the counter-clockwise direction. When the driving gear 36*b* is rotated, the electric wire cover engaged with the driving gear 36*b* moves forward so as to push out the bar code scanner 20. When the bar code scanner 20 moves a specified distance, the motor 36*a* is stopped and the user can grasp and draw out the bar code scanner 20 exposed from the front side of the control panel 15. When the user wishes to insert the bar code scanner 20 into the scanner guide 18, the user holds the bar code scanner 20 and slightly pushes the bar code scanner 20 into the scanner guide 18. When the electric wire cover 27 is engaged with the driving gear 36*b*, the motor 36*a* is driven, so that the motor 36*a* rotates in the clockwise direction to pull the bar code scanner 20 into the scanner guide 18. In order to control the motor 36*a* when inserting the bar code scanner 20, the control panel 15 is provided with an additional manipulation switch, or a sensor for detecting the inserting position of the bar code scanner 20, so that a part of the bar code scanner 20 is inserted to a specified position, and the rest of the bar code scanner 20 can be inserted by the driving force of the motor 36*a*.

Hereinafter, the structure of the bar code scanner 20 will be described with reference to FIGS. 3 and 4. Some aspects of the bar code scanner 20 are similar to a conventional bar code scanner 20. In particular, the bar code scanner 20 includes a light emitting device 28 for emitting light to read the bar code, and a light receiving device 29 for converting the light reflected from the bar code into an electric signal.

Meanwhile, the bar code scanner 20 of the microwave oven according to the present embodiment directs the light emitted from the light emitting device 28 in the length direction of the bar code scanner 20 and in the direction perpendicular to the lengthwise direction. For achieving this, the bar code scanner 20 includes a body 21 in which a conventional light-emitting device 28 and the light receiving device 29 are installed, and a head 22 provided at the front end of the body 21. The light enters and exits through a transparent window 23 provided at the front end of the head 22. The head 22 is in slant contact with the body 21 so as to form a specified angle with respect to the axis direction of the body 21. The slant angle is preferably about 45 degrees with respect to the axis direction of the body 21.

Figure 4:
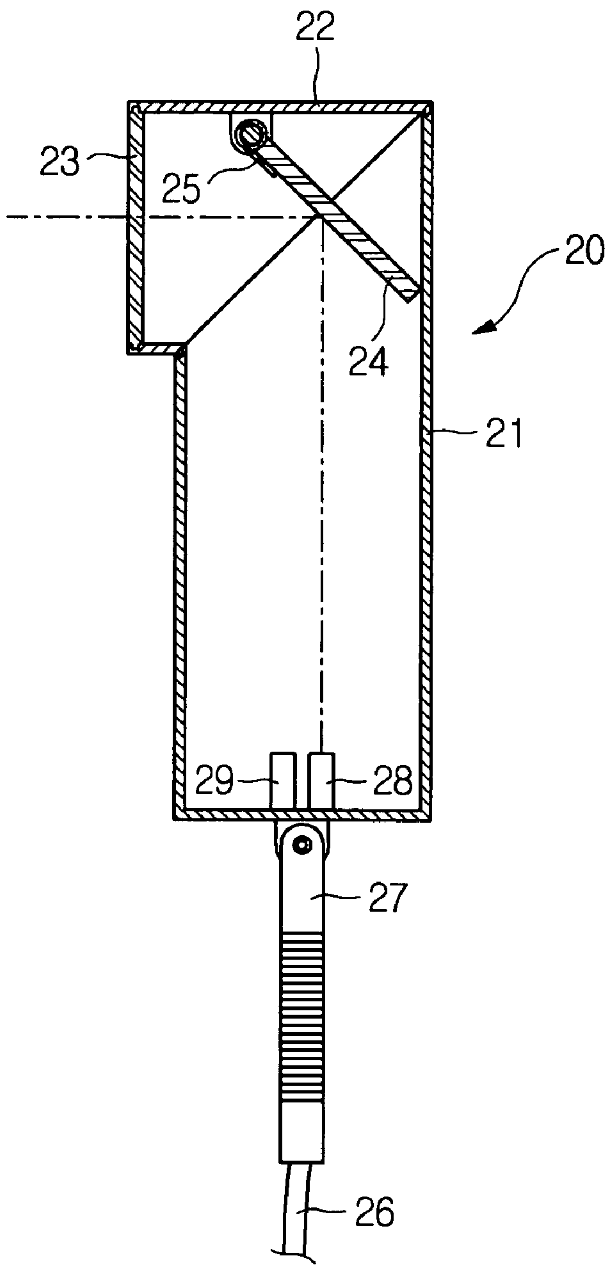
FIG. 4 is a side cross-sectional view illustrating the structure of the bar code scanner shown in FIG. 1.

The head 22 is slidably installed at a connecting point where the head 22 is connected to the body 21, so that the user can rotate the head 22 about the central axis thereof, thus the head 22, as shown in FIG. 4, is rotated. In order to make the entering and exiting light travel along the bent direction, the head 22 includes a reflective mirror 24 having an angle with respect to the inner surface of the head 22, which is changed according to the rotation of the head 22. One end of the reflective mirror 24 is hinged to the inner surface of the head 22, and the hinged point is provided with a spring 25 for applying a restoring force to the reflective mirror 24 to be close to the inner walls of the head 22 and the body 21.

According to the above-described embodiment of a microwave oven with a bar code scanner of the present invention, since the bar code scanner is detachably installed to the control panel, a user can use the bar code scanner while it is fixed to the control panel or can use the bar code scanner by drawing the bar code scanner from the microwave oven.

Moreover, since the angel of the head is changed, the direction of the light emitted from the bar code scanner can be changed, and thus it is convenient to use.

Although an embodiment of the present invention have been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A microwave oven comprising:

a body;

a control panel;

a bar code scanner removably installed in the body and reading a bar code; and a driving section moving the bar code scanner forward and rearward a specified distance so as to respectively draw out and draw in the bar code scanner with respect to the control panel.

2. The microwave oven according to claim 1, wherein the driving section includes:

a forwardly and reversely rotating motor including a driving shaft; and a driving gear rotated by the driving shaft, and wherein the bar code scanner includes a gear member engaging the driving gear.

3. The microwave oven according to claim 2, wherein the gear member engages an electric wire cover connected to an end of the bar code scanner and connecting the bar code scanner to the body.

4. A microwave oven comprising:

a body;

a control panel; and a bar code scanner removably installed in the body and reading a bar code, wherein the bar code scanner includes:

a body of bar code scanner in which the light emitting device and a light receiving device are installed; and a head coupled to a front end of the body of bar code scanner, and wherein the head is obliquely coupled to the body, and an angle of the head is changed by rotation so as to change the scanning angle of the light by rotating about a central axis of the body of bar code scanner.

5. The microwave oven according to claim 4, wherein the bar code scanner includes a reflective mirror installed in the bar code scanner and changing the scanning angle of the light by changing the angle of the reflective mirror by rotating the head.

6. The microwave oven according to claim 5, wherein the reflective mirror is hinged to an inside of the head.

7. A microwave oven comprising:

a control panel;

a scanner guide in the control panel;

a scanner drawable into the scanner guide and pushable out of the scanner guide; and a driving section drawing the scanner into and pushing the scanner out of the scanner guide, wherein the bar code scanner reads a bar code when in the scanner guide and when out of the scanner guide.

8. The microwave oven of claim 7, wherein the scanner guide extends toward a rear of the control panel, and includes a blocking jaw at a rear thereof restricting travel of the scanner when the scanner is drawn into the scanner guide.

9. The microwave oven of claim 7, wherein the driving section includes:

a forwardly and reversibly rotating motor having a driving shaft; and a driving gear coupled to the motor and rotated by the driving shaft.

10. The microwave oven of claim 9, wherein the scanner includes a wire cover extending from a rear thereof, the wire cover having external threads which engage the driving gear.

11. The microwave oven of claim 10, wherein, when the driving gear is rotated in a first direction, the electric wire cover moves forwardly so as to push the scanner out of the scanner guide a specified distance, and, when the driving gear is rotated in a second direction opposite the first direction, the electric wire cover moves rearward so as to draw the scanner into the scanner guide.

* * * * *